(12) United States Patent (10) Patent No.: US 12,588,013 B2
Yamaoka et al. (45) Date of Patent: Mar. 24, 2026

(54) COMMUNICATION MANAGEMENT DEVICE, COMMUNICATION MANAGEMENT METHOD, AND STORAGE MEDIUM FOR COMMUNICATION MANAGEMENT

(71) Applicant: DENSO CORPORATION, Kariya (JP)

(72) Inventors: Kousuke Yamaoka, Kariya (JP); Masayuki Hoshino, Kariya (JP)

(73) Assignee: DENSO CORPORATION, Kariya-city (JP)

( * ) Notice: Subject to any disclaimer, the term of this patent is extended or adjusted under 35 U.S.C. 154(b) by 425 days.

(21) Appl. No.: 18/172,104

(22) Filed: Feb. 21, 2023

(65) Prior Publication Data

US 2023/0209523 A1 Jun. 29, 2023

Related U.S. Application Data

(63) Continuation of application No. PCT/JP2021/034915, filed on Sep. 23, 2021.

(30) Foreign Application Priority Data

Sep. 29, 2020 (JP) ................................. 2020-163787

(51) Int. Cl.
*H04W 72/0453* (2023.01)
*G08G 1/09* (2006.01)
(Continued)

(52) U.S. Cl.
CPC .......... *H04W 72/0453* (2013.01); *G08G 1/09* (2013.01); *H04L 13/00* (2013.01);
(Continued)

(58) Field of Classification Search
None
See application file for complete search history.

(56) References Cited

U.S. PATENT DOCUMENTS

| | | | |
|---|---|---|---|
| 6,590,865 B1 | 7/2003 | Ibaraki et al. | |
| 2012/0207115 A1 | 8/2012 | Oh | |

(Continued)

FOREIGN PATENT DOCUMENTS

| | | |
|---|---|---|
| JP | 2000-115198 A | 4/2000 |
| JP | 2010198260 A | 9/2010 |

(Continued)

OTHER PUBLICATIONS

U.S. Appl. No. 18/171,998, filed Feb. 21, 2023, Yamaoka.

*Primary Examiner* — Jay L Vogel
(74) *Attorney, Agent, or Firm* — Harness, Dickey & Pierce, P.L.C.

(57) ABSTRACT

A center server corresponding to a communication management device manages communication between a vehicle and an outside thereof. The center server includes: a request acquisition unit corresponding to an acquisition unit that acquires a requested bandwidth, which is a communication bandwidth requested for execution of a specific process in the vehicle, a radio resource arbitration unit corresponding to an identification unit that identifies a frequency band to which the requested bandwidth is allocated, according to a communication capacity of the vehicle, and a request response unit corresponding to a transmission unit that transmits, to the vehicle, an allocation result of allocating the requested bandwidth to the identified frequency band.

10 Claims, 7 Drawing Sheets

(51) Int. Cl.

| | |
|---|---|
| *H04L 13/00* | (2006.01) |
| *H04W 4/44* | (2018.01) |
| *H04W 28/20* | (2009.01) |
| *H04W 72/40* | (2023.01) |

(52) U.S. Cl.
CPC .............. *H04W 28/20* (2013.01); *H04W 4/44* (2018.02); *H04W 72/40* (2023.01)

(56) References Cited

U.S. PATENT DOCUMENTS

| | | | |
|---|---|---|---|
| 2012/0263130 A1 | 10/2012 | Ishikura et al. | |
| 2014/0112298 A1 | 4/2014 | Oh | |
| 2016/0359741 A1* | 12/2016 | Cooper | H04W 4/44 |
| 2017/0180088 A1 | 6/2017 | Adachi et al. | |
| 2017/0280296 A1* | 9/2017 | Divakaran | H04W 4/025 |
| 2017/0280442 A1 | 9/2017 | Oh | |
| 2018/0317222 A1 | 11/2018 | Oh | |
| 2019/0356435 A1 | 11/2019 | Adachi et al. | |
| 2020/0064142 A1* | 2/2020 | Choi | G07C 5/008 |
| 2020/0221349 A1 | 7/2020 | Nakata | |
| 2021/0114616 A1* | 4/2021 | Altman | H04W 76/15 |
| 2022/0190979 A1 | 6/2022 | Adachi et al. | |
| 2023/0209409 A1* | 6/2023 | Yamaoka | H04W 28/20 |
| | | | 370/328 |

FOREIGN PATENT DOCUMENTS

| | | | | |
|---|---|---|---|---|
| JP | 2019-080320 A | | 5/2019 | |
| KR | 20120083402 A | * | 7/2012 | |
| WO | WO-2011052447 A1 | | 5/2011 | |
| WO | WO-2011065407 A1 | | 6/2011 | |
| WO | WO-2019065676 A1 | | 4/2019 | |
| WO | WO-2020069357 A1 | * | 4/2020 | H04L 5/0053 |
| WO | WO-2020099069 A1 | * | 5/2020 | |

* cited by examiner

| SENSOR | | NIGHT | FAR SIDE | BACK-LIGHT | BAD WEATHER | LATERAL DIRECTION | SMALL OBJ/LOW REFLECTION OBJ | DISTANCE MEASURE-MENT |
|---|---|---|---|---|---|---|---|---|
| CAMERA | SINGLE | × | △ | × | × | * | ○ | △ |
| | STEREO | × | △ | × | × | × | ○ | ○ |
| | WIDE ANGLE | × | × | × | × | ○ | ○ | × |
| | TELE | × | ○ | × | × | × | ○ | × |
| MILLIMETER-WAVE | | ○ | △ | ○ | ○ | * | × | ○ |
| 3D LiDAR | | ○ | ○ | ○ | × | ○ | ○ | ○ |
| ULTRASOUND (NEARBY FIELD) | | ○ | × | ○ | ○ | ○ | ○ | ○ |

COMMUNICATION MANAGEMENT DEVICE, COMMUNICATION MANAGEMENT METHOD, AND STORAGE MEDIUM FOR COMMUNICATION MANAGEMENT

CROSS REFERENCE TO RELATED APPLICATION

The present application is a continuation application of International Patent Application No. PCT/JP2021/034915 filed on Sep. 23, 2021, which designated the U.S. and claims the benefit of priority from Japanese Patent Application No. 2020-163787 filed in Japan on Sep. 29, 2020. The entire disclosures of all of the above applications are incorporated herein by reference.

TECHNICAL FIELD

The disclosure in this description relates to a technique for managing communication between a vehicle and an outside thereof.

BACKGROUND

A system may limit safe driving support service targets to specific areas having a high traffic accident rate. When the system detects a vehicle entering a specific area, it uploads information of such vehicle regarding a position, a speed, and a direction, so as to enables information exchange between vehicles potentially colliding, thereby limiting the number of vehicles which are allowed to use communication bandwidth.

However, the amount of data transmitted and received by vehicles tends to increase in recent years. If simply limiting the communication area, it may cause congestion of the communication when there are many vehicles performing wireless communication in the relevant area, or when the amount of data to be transmitted and received is large.

SUMMARY

The present disclosure provides a communication management device, a communication management method, and a non-transitory, tangible storage medium storing a communication management program including instructions to be executed by a processor.

According to an aspect of the present disclosure, a requested bandwidth, which is a communication bandwidth requested for execution of a specific process in a vehicle, is acquired. The requested bandwidth includes a desired bandwidth and a required bandwidth that are different level bandwidths. A frequency band to which the requested bandwidth is allocated is identified according to a communication capacity of the vehicle. An allocation result of allocating the requested bandwidth with respect to the identified frequency band is transmitted to the vehicle. The allocation result may include whether at least one of the desired bandwidth or/and the required bandwidth is available.

BRIEF DESCRIPTION OF THE DRAWINGS

The above and other objects, features and advantages of the present disclosure will become more apparent from the following detailed description made with reference to the accompanying drawings. In the drawings.

EMBODIMENTS FOR CARRYING OUT THE INVENTION

Figure 1:
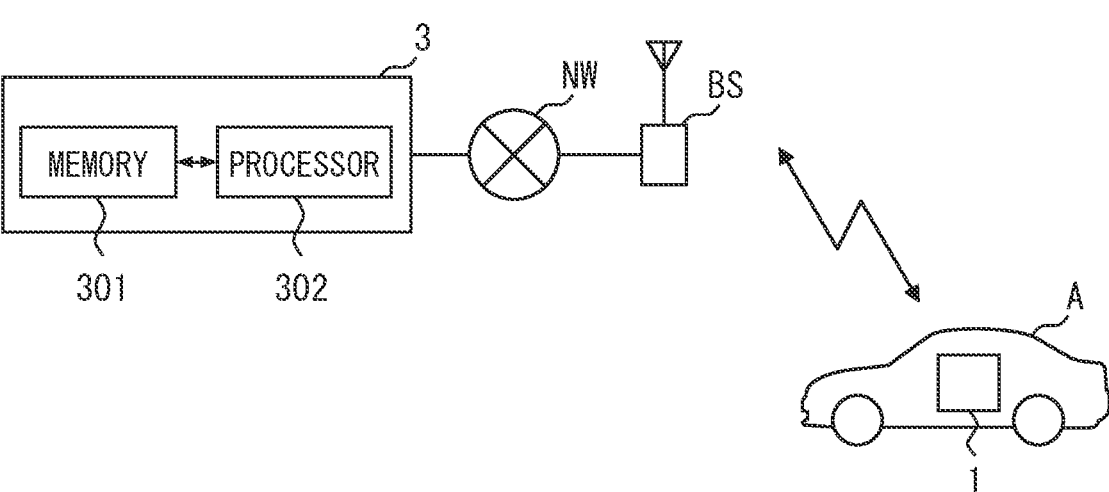
FIG. 1 is a diagram showing a vehicle system and a center server.

It is an object of the disclosure to provide a communication management device, a communication management method, and a communication management program capable of suppressing congestion of communication.

One of the disclosed communication management devices is a communication management device that manages communication between a vehicle and an outside of the vehicle. The communication management device includes: an acquisition unit configured to acquire a requested bandwidth, which is a communication bandwidth requested for execution of a specific process in the vehicle; an identification unit configured to identify a frequency band according to a communication capacity of the vehicle, the frequency band to which the requested bandwidth is allocated; and a transmission unit configured to transmit, to the vehicle, an allocation result of allocating the requested bandwidth to the identified frequency band.

One of the disclosed communication management methods is a communication management method performed by a processor to manage communication between a vehicle and an outside of the vehicle. The method includes: an acquisition process that acquires a requested bandwidth, which is a communication bandwidth requested for execution of a specific process in the vehicle; an identification process that identifies a frequency band according to a communication capacity of the vehicle, the frequency band to which the requested bandwidth is allocated; and a transmission process that transmits, to the vehicle, an allocation result of the requested bandwidth to the identified frequency band.

One of the disclosed communication management programs is a communication management program stored in a storage medium and including instructions to be executed by a processor to manage communication between a vehicle and an outside of the vehicle. The instructions include: an acquisition process that acquires a requested bandwidth, which is a communication bandwidth requested for execution of a specific process in the vehicle; an identification process that identifies a frequency band according to a communication capacity of the vehicle, the frequency band to which the requested bandwidth is allocated; and a transmission process that transmits, to the vehicle, an allocation result of the requested bandwidth to the identified frequency band.

According to these disclosures, a frequency band to which the requested bandwidth is allocated, which is the communication bandwidth requested for execution of a specific process in the vehicle, is identified according to the communication capacity of the vehicle. Therefore, according to a difference of the communication capacity of the respective vehicles, respectively different communication bands can be allocated to the respective vehicles.

Hereinafter, a plurality of embodiments for carrying out the present disclosure will be described with reference to the drawings. In each embodiment, parts corresponding to an item described in the prior embodiment are denoted by the same reference numerals, and redundant description may be omitted. When only a part of the configuration is described in each embodiment, another embodiment described previously may be applied to the other parts of the configuration. Not only a combination of parts that are specifically indicated as combinable in each embodiment but also a partial combination of embodiments without being explicitly indicated is possible when no particular obstacle to the combination arises.

First Embodiment

Figure 2:
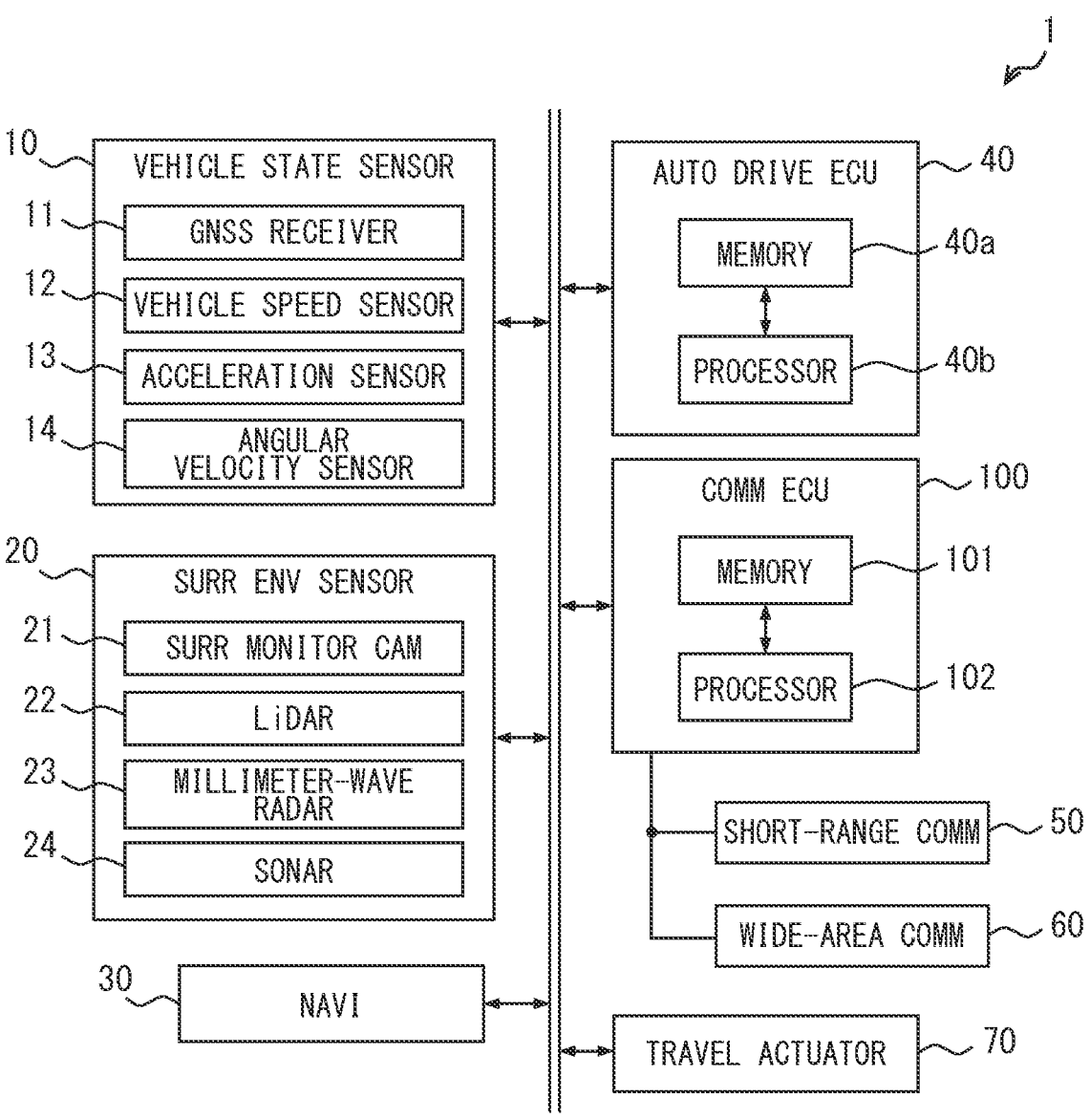
FIG. 2 is a diagram showing an entire vehicle system including a communication ECU.

An overall system including a communication ECU 100 of the first embodiment will be described with reference to FIGS. 1 to 9. The communication ECU 100 is an electronic control unit mounted on a vehicle A. The vehicle A can communicate with a center server 3 via a base station BS and a network NW. As shown in FIG. 2, the communication ECU 100 is connected to a vehicle state sensor 10, a surrounding environment sensor 20, a navigation device 30, an automatic drive ECU 40, a short-range communication device 50, a wide-area communication device 60 and a travel actuator 70 via a communication bus and the like.

The vehicle state sensor 10 is a sensor group for detecting various states of the vehicle A. The vehicle state sensor 10 includes a GNSS receiver 11, a vehicle speed sensor 12, an acceleration sensor 13, and an angular velocity sensor 14, for example. The GNSS receiver 11 detects a position of the vehicle A based on navigation signals from positioning satellites. The vehicle speed sensor 12 detects a speed of the vehicle A. The acceleration sensor 13 detects acceleration acting on the vehicle A. The angular velocity sensor 14 detects an angular velocity acting on the vehicle A.

The surrounding environment sensor 20 is a sensor group that detects various types of information about a surrounding environment of the vehicle A. The surrounding environment sensor 20 includes a surrounding monitor camera 21, a LiDAR (Light Detection and Ranging/Laser Imaging Detection and Ranging) 22, a millimeter-wave radar 23, and a sonar 24, for example. The surrounding monitor camera 21 capture an image of a predetermined range including a front field of the vehicle A. The LiDAR 22 emits a laser beam and detects a group of points, regarding feature points of a feature, by detecting reflected light of the laser beam reflected by the feature. The millimeter-wave radar 23 generates detection information of the surrounding environment by receiving reflected waves of emitted millimeter waves or quasi-millimeter waves. The sonar 24 generates detection information of the surrounding environment by receiving reflected ultrasonic waves.

The navigation device 30 is an in-vehicle device that provides route guidance to a destination set by a user. The navigation device 30 searches for multiple routes to a destination, to satisfy conditions such as time priority and distance priority. When one of the multiple searched routes is selected, the navigation device 30 provides the automatic drive ECU 40 with route information regarding a planned travel route.

The automatic drive ECU 40 and the communication ECU 100 each have a configuration mainly including a computer having memories 40a, 101, processors 40b, 102, input/output interfaces, buses connecting these, and the like. The processors 40b and 102 are hardware for arithmetic processing or computing. The processors 40b and 102 include at least one type of core among, for example, a CPU (Central Processing Unit), an MPU (Micro-Processing Unit), a GPU (Graphics Processing Unit), a DFP (Data Flow Processor) and a RISC (Reduced Instruction Set Computer)-CPU. The processors 40b, 102 may also be realized as a combination of plural types of arithmetic processors, such as the CPU, MPU, GPU and the like.

The memories 40a and 101 are at least one type of non-transitory, tangible storage medium storing computer-readable programs and/or data non-temporarily, such as, for example, a semiconductor memory, a magnetic medium, an optical medium, and the like. The memories 40a and 101 store various programs executable by corresponding processors 40b and 102, respectively. As the memories 40a, 101, various kinds of storage medium such as an HDD (Hard-Disk Drive), SSD (Solid State Drive), an EPROM (Erasable, Programmable ROM) and the like are adoptable. Specifically, the memory 40a stores a travel support program for supporting travel for the vehicle A. The memory 101 stores a communication control program for controlling communication between the vehicle A and the cloud and/or other vehicle(s).

The processors 40b, 102 execute a plurality of instructions stored in programs stored in the corresponding memories 40a, 101. Thereby, the automatic drive ECU 40 and the communication ECU 100 are configured to implement a plurality of functional units. The details of the functional units implemented by the respective ECUs 40 and 100 will be described later.

The short-range communication device 50 and the wide-area communication device 60 are communication modules mounted on the vehicle A. The short-range communication device 50 has a communication function in a relatively narrow range such as vehicle to roadside infrastructure (hereinafter "V2I") communication, vehicle to pedestrian (hereinafter "V2P") communication and vehicle to vehicle (hereinafter "V2V") communication. The wide-area communication device 60 has at least a function of V2N (Vehicle to cellular Network) communication in accordance with communication standards such as LTE (Long Term Evolution) and 5G, and communicates with the base station BS around the vehicle A, i.e., sends and receives radio waves therebetween. The wide-area communication device 60 is configured to enable cooperation between the cloud and the in-vehicle system (Cloud to Car) by V2N communication. By installing the wide-area communication device 60, the vehicle A becomes a connected car that can be connected to the Internet.

The travel actuator 70 is a travel control device group that controls travel of the vehicle A. The travel actuator 70 includes, for example, an electronically-controlled throttle, a brake actuator, and an EPS (Electric Power Steering) motor. Based on a control instruction from the automatic drive ECU 40, the travel actuator 70 performs autonomous travel or driving assistance in accordance with the control instruction.

The travel actuator 70 may acquire the control instruction directly from the automatic drive ECU 40 or indirectly through another ECU.

Figure 3:
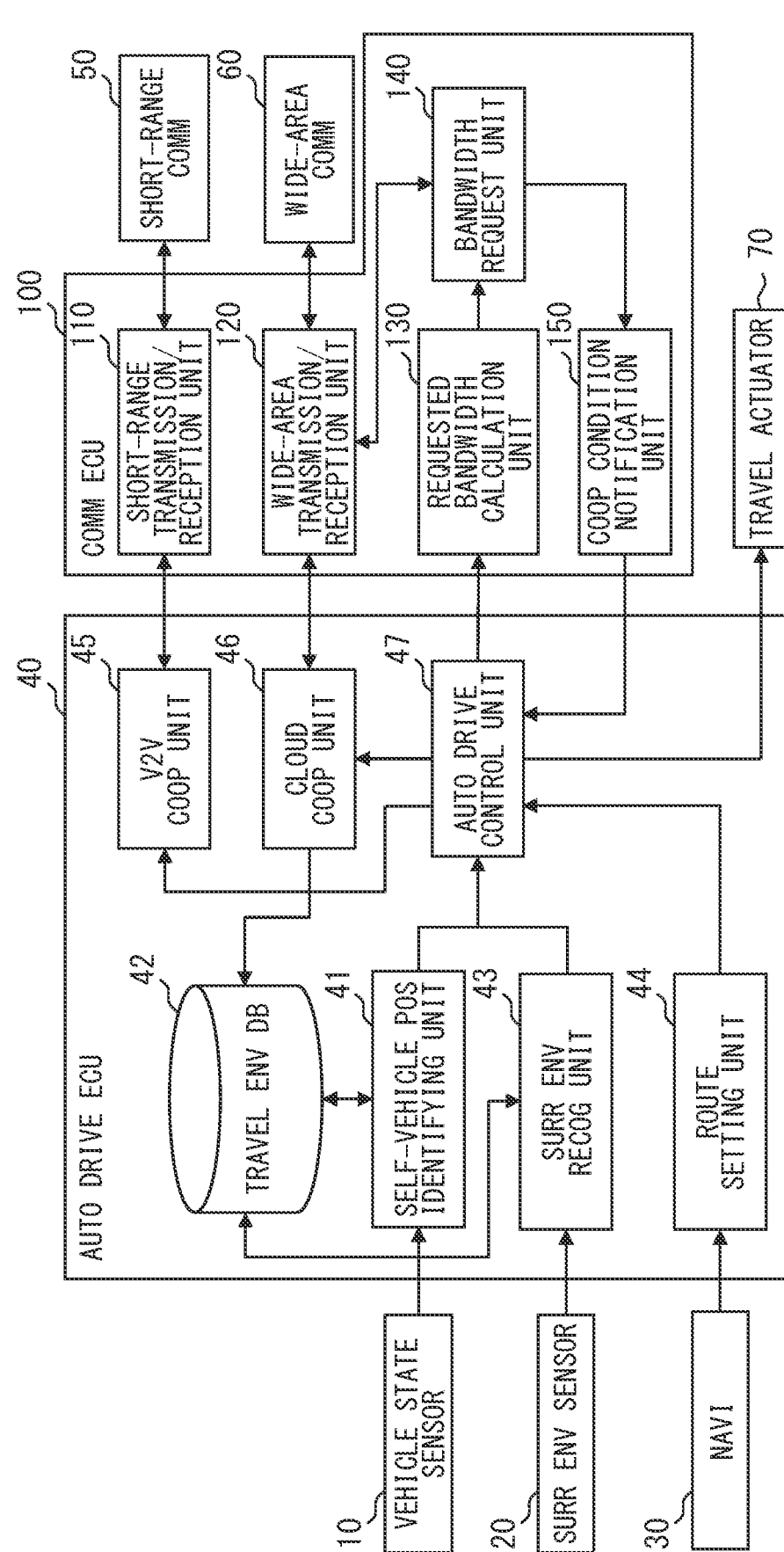
FIG. 3 is a block diagram showing an example of functions possessed by the communication ECU.

Next, details of the functional units implemented by the automatic drive ECU 40 and the communication ECU 100 will be described with reference to FIG. 3. The automatic drive ECU 40 implements a plurality of functional units for automatic drive control that partially or substantially-entirely controls a travel of the vehicle A. Specifically, the automatic drive ECU 40 includes a self-vehicle position estimation unit 41, a surrounding environment recognition unit 43, a route setting unit 44, a vehicle-to-vehicle cooperation unit 45, a cloud cooperation unit 46, and an automatic drive control unit 47 as functional units.

The self-vehicle position estimation unit 41 estimates a position of the vehicle A based on behavior information acquired from the vehicle state sensor 10 and map data acquired from a travel environment database (DB) 42 in a storage unit of a vehicle-mounted device.

The surrounding environment recognition unit 43 estimates a state of the surroundings of the vehicle A by using information on moving objects and feature information around the vehicle A acquired from the surrounding environment sensor 20 as well as surrounding environment information stored in the travel environment DB 42. The route setting unit 44 acquires route information about a planned travel route from the navigation device 30, and sets it as a route that the vehicle A follows in automatic driving.

Via the short-range communication device 50 and the communication ECU 100, the vehicle-to-vehicle cooperation unit 45 acquires data transmitted from other vehicles, and provides data to be transmitted to the other vehicles.

The cloud cooperation unit 46 acquires data transmitted from the cloud via the wide-area communication device 60 and the communication ECU 100. Specifically, the cloud cooperation unit 46 acquires travel environment information on the planned route from the center server 3. The travel environment information includes traffic information such as congestion, complexity of road structure, weather information, and regulation information involving accidents, events or the like.

The automatic drive control unit 47 recognizes surrounding environment of the vehicle A from the position of the vehicle, determines details of control, and generates a control instruction to be output to the travel actuator 70. In addition, the automatic drive control unit 47 determines whether or not a travel area of the vehicle A exceeds an ODD (operation design domain) based on the travel environment information. When it is determined that the ODD is exceeded in the travel area, the automatic drive control unit 47 determines that automatic driving is not possible, and shifts to different operation mode, such as handover of the travel control to the driver or stopping the vehicle A. When it is determined that the travel area is within the ODD, the automatic drive control unit 47 determines whether automatic drive control is continuable, without using communication. When it is determined that the travel area is within the ODD and the automatic operation control is continuable without communication, the automatic drive control unit 47 continues an automatic drive control process. When it is determined that the travel area is within the ODD and communication is required, the automatic drive control unit 47 generates a communication utilization request, and inquires the communication ECU 100 whether or not communication utilization is possible (i.e., sends a communication utilization inquiry to the communication ECU 100).

Figures 4, 5:
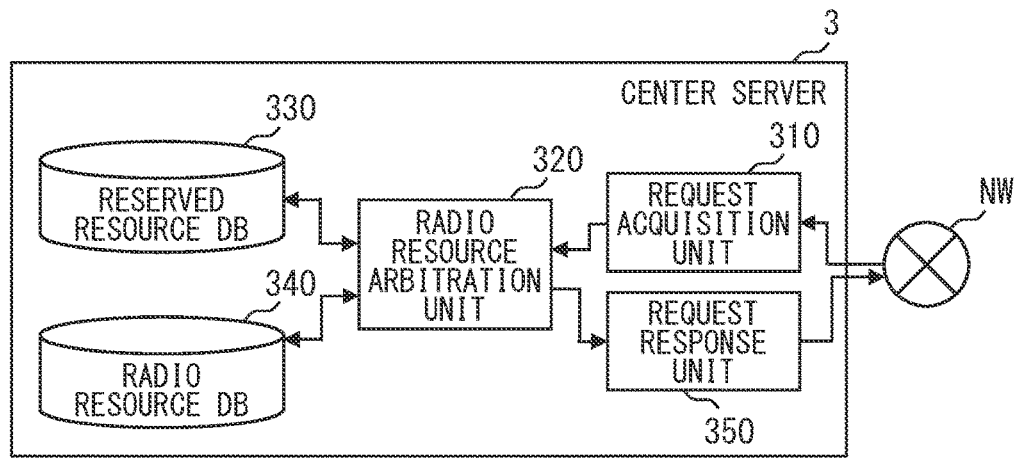
FIG. 4 is a block diagram showing an example of functions possessed by the center server.
FIG. 5 is a diagram showing an example of sensing capability of each of surrounding environment sensors.

The automatic drive control unit 47 calculates, as the communication utilization inquiry, a difference from the surrounding environment information required for a travel of the vehicle A along a predicted travel route while maintaining a level of an automatic drive requested by the user based on the performance of the sensor group and control software provided in the vehicle A. For example, in case that the vehicle A is equipped with only the surrounding monitor camera 21 as the surrounding environment sensor 20, as illustrated in the table of FIG. 5, deterioration of recognition performance of the camera 21 may be assumed in an adverse environment such as a night time, a backlight, a bad weather (e.g., dense fog or the like). Therefore, when it is determined that the vehicle A is traveling in such an environment, the automatic drive control unit 47 requests for acquisition of position information of surrounding moving bodies, and the like, as the communication utilization request. In the table of FIG. 5, the performance of the surrounding environment sensor 20 is shown (i.e., rated) as deteriorating from good to bad in an order of a circle mark (good), a triangle mark (not good), and a cross mark (bad) in respectively-denoted environments. Further, an asterisk in the table indicates that the performance evaluation in the denoted environment changes depending on a mounting position or the number of the surrounding environment sensors 20.

The automatic drive control unit 47 generates multiple levels of communication utilization requests. For example, the automatic drive control unit 47 generates two levels of communication utilization requests, a desired level and a required level. In addition, the automatic drive control unit 47 generates another communication utilization request, for performing a data transmission process, which reports various sensor data to the center server 3, which are data utilizable for continuation of the automatic driving of a self-vehicle or other vehicles. Even in such case, the automatic drive control unit 47 may generate plural levels of communication utilization requests.

The automatic drive control unit 47 sets a cloud utilization condition that limits utilization of communication within a setting range, when receiving a response to the inquiry from the communication ECU 100.

Next, functional units constructed by the communication ECU 100 will be described. The communication ECU 100 constructs a plurality of functional units for communication control of the vehicle A. Specifically, the communication ECU 100 includes functional units such as a short-range transmission/reception unit 110, a wide-area transmission/reception unit 120, a requested bandwidth calculation unit 130, a bandwidth request unit 140, a cooperation condition notification unit 150, and the like. The short-range transmission/reception unit 110 communicates with the outside via the short-range communication device 50. The wide-area transmission/reception unit 120 communicates with the outside via the wide-area communication device 60.

The requested bandwidth calculation unit 130 calculates a requested bandwidth, which is a communication bandwidth that is requested to be secured for performing the automatic driving control in the vehicle A, based on at least one of the computing power or/and sensing capability of the vehicle A. For example, when the requested bandwidth calculation unit 130 acquires an inquiry of a communication utilization request generated by the automatic drive control unit 47 based on the sensing capability described above, the requested bandwidth calculation unit 130 calculates a communication bandwidth for accommodating the requested content, by confirming the content of the communication utilization request. At this time, the requested bandwidth calculation unit 130 calculates two different-level bandwidths respectively as the requested bandwidth, i.e., a desired bandwidth corresponding to the desired level and a required bandwidth corresponding to the required level. The automatic drive control is an example of a "specific process."

The bandwidth request unit 140 transmits, as a communication bandwidth reservation request, information of the calculated requested bandwidth to the center server 3 via the wide-area transmission/reception unit 120.

The cooperation condition notification unit 150 responds to the inquiry from the automatic drive control unit 47 upon receiving a response result from the center to the request. In the response, it is returned as a response content that the desired bandwidth is available, the required bandwidth is available, the bandwidth is not secured or the like. When a change notification is received from the center server 3 in response to a reservation request, the content of the change is notified to the automatic drive ECU 40.

The center server 3 is a communication management device that manages communication with a plurality of vehicles A. Specifically, the center server 3 manages a communication bandwidth utilized by the plurality of vehicles A. Like the automatic drive ECU 40 and the communication ECU 100, the center server 3 mainly includes a computer having a memory 301, a processor 302, an input/output interface, and a bus connecting them. The memory 301 stores various programs such as a communication management program executed by the processor 302.

The processor 302 executes instructions included in the programs stored in the memory 301. Thereby, the center server 3 constructs a plurality of functional units. Specifically, the center server 3 executes instructions included in the communication management program, thereby constructing a request acquisition unit 310, a radio resource arbitration unit 320, and a request response unit 350 as functional units, as shown in FIG. 4.

The request acquisition unit 310 acquires a communication bandwidth reservation request from the vehicle A. The radio resource arbitration unit 320 manages a capacity of radio resources for each base station BS, and reserves resources in response to the communication bandwidth reservation request from the vehicle A. The radio resource arbitration unit 320 acquires from a radio resource DB 340 a capacity of radio resources in a base station BS area for which an inquiry has been made. In addition, the radio resource arbitration unit 320 acquires a current reservation status of radio resources from a reserved resource DB 330. The radio resource arbitration unit 320 predicts whether the requested bandwidth can be secured. The radio resource arbitration unit 320 responds to the request that the desired bandwidth is available when the requested radio resources are within the capacity and the requested bandwidth can be secured up to the desired bandwidth. Further, in case that the requested bandwidth is securable only up to the required bandwidth, the radio resource arbitration unit 320 responds to the request that the required bandwidth is available when the requested bandwidth can be secured only up to the required bandwidth.

On the other hand, when the requested bandwidth exceeds the capacity, the radio resource arbitration unit 320 confirms whether reallocation of reserved resources is possible. The radio resource arbitration unit 320 determines whether to reallocate the radio resources already reserved as the desired bandwidth. That is, the radio resource arbitration unit 320 determines whether or not it is possible to secure the requested bandwidth, which is currently exceeds the capacity in the relevant base station BS area, by changing the radio resource that has been reserved as the amount of the desired bandwidth to the amount of the required bandwidth. When radio resources that are reallocatable can be secured, the radio resource arbitration unit 320 updates the reserved resources, and generates an arbitration result indicating that the desired bandwidth is available or the required bandwidth is available. In such case, the radio resource arbitration unit 320 generates the arbitration result which includes information on an allocated frequency described later. When the reallocation is not possible, the radio resource arbitration unit 320 transmits the arbitration result indicating that the requested bandwidth is not secured. When the reserved resource BD is updated for reallocation, the radio resource arbitration unit 320 notifies a target vehicle of the change notification.

The radio resource arbitration unit 320 identifies a frequency (i.e., an allocated frequency), which is a frequency to be allocated in high priority to the vehicle A from among frequencies corresponding to the vehicle A. The radio resource arbitration unit 320 identifies the allocated frequency according to the communication capacity of the vehicle from which a request is received. For example, when receiving a request from a high-end vehicle which has relatively many corresponding (i.e., allocatable) frequencies, the radio resource arbitration unit 320 identifies a frequency that is not accommodated by a low-grade vehicle which has relatively few corresponding (i.e., allocatable) frequencies. Although an example in the above describes an allocation of a frequency band upon receiving a communication bandwidth request, a frequency may be allocated during a wait/standby time of an in-vehicle device. The radio resource arbitration unit 320 is an example of an "identification unit." The request response unit 350 performs, to the vehicle A, a transmission of a response to the request, based on an arbitration result of the radio resource arbitration unit 320. The request response unit 350 is an example of a "transmission unit."

Figure 6:
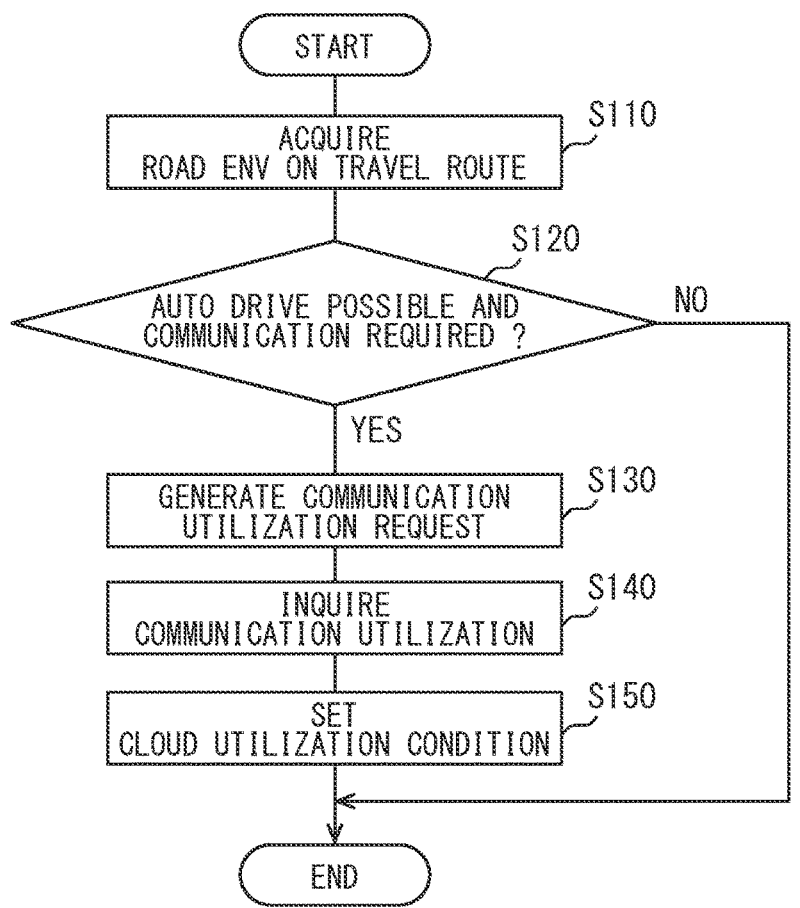
FIG. 6 is a flowchart showing an example of a communication request generation method performed by an automatic drive ECU.
Figure 7:
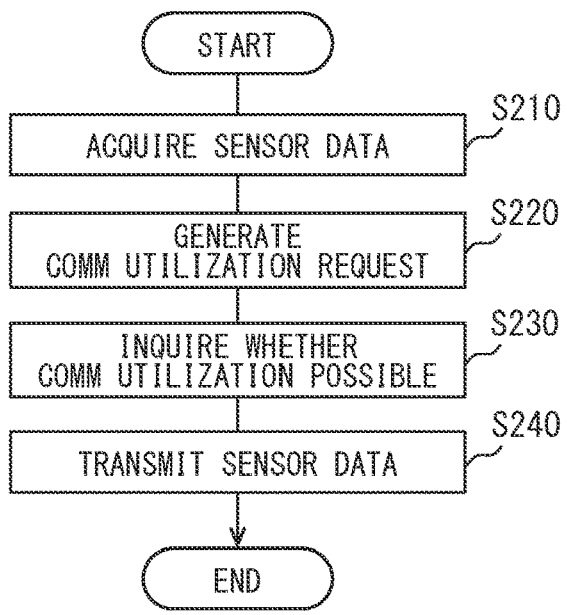
FIG. 7 is a flowchart showing another example of a communication request generation method performed by the automatic drive ECU.
Figure 8:
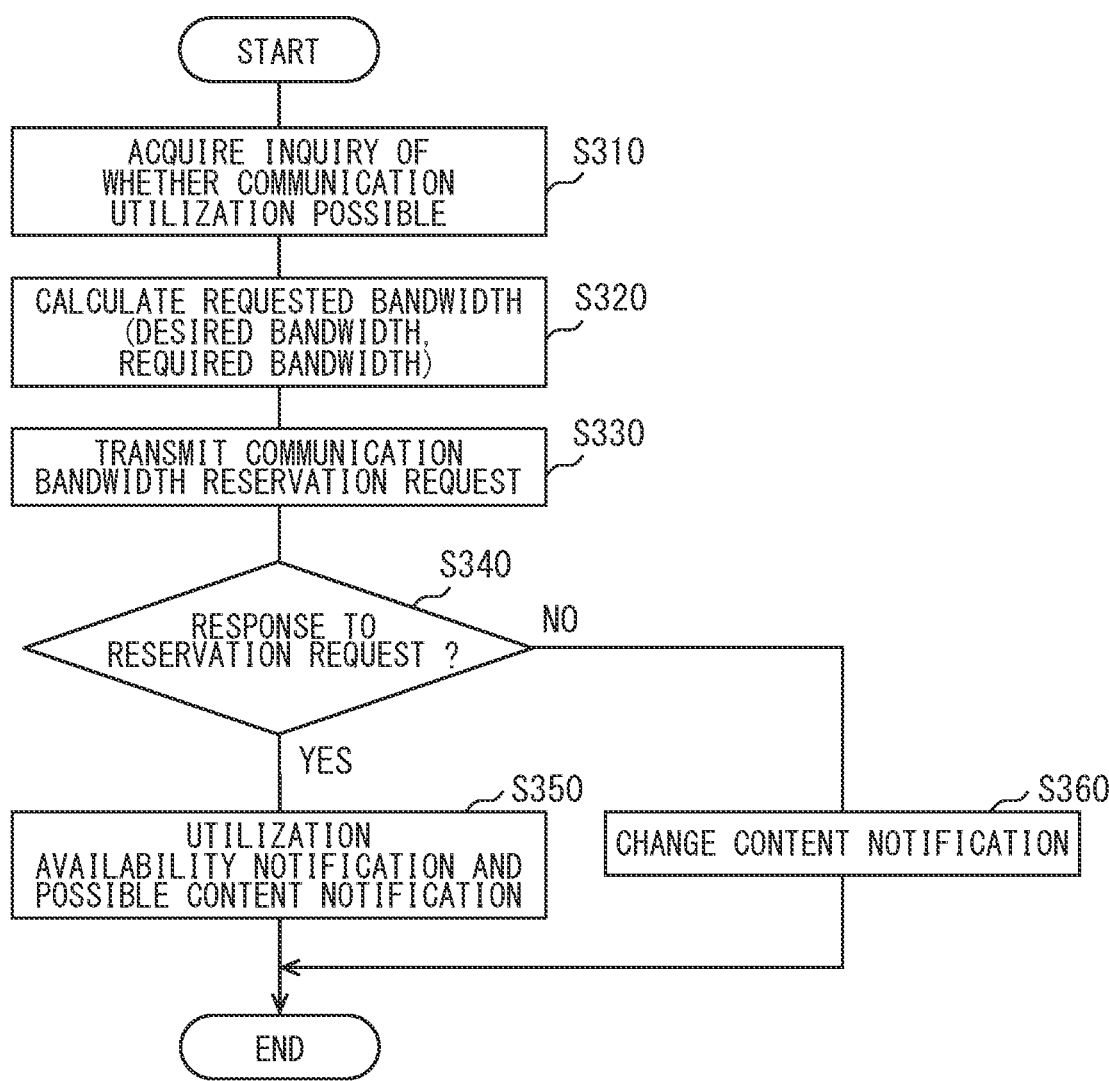
FIG. 8 is a flowchart showing an example of a communication control method performed by the communication ECU.

Next, a flow of each of the methods performed by the automatic drive ECU 40, the communication ECU 100 and the center server 3 in cooperation with the functional blocks will be described below with reference to FIGS. 6 to 8. In a flow described below, "S" means multiple steps of the flow to be performed by multiple instructions included in a program.

First, a processing method performed by the automatic drive ECU 40 will be described with reference to FIG. 6.

In S110, the cloud cooperation unit 46 acquires a road environment on the predicted travel route from the center server 3. The road environment includes traffic information such as congestion, complexity of road structure, weather information, and regulation information such as accidents and events. Next, in S120, the automatic drive control unit 47 determines whether automatic driving is possible and whether communication is required to continue automatic driving. If it is determined that the automatic driving is impossible or the communication is not required to continue the automatic driving, the automatic drive control unit 47 ends the series of processing because there is no need for the communication utilization request.

On the other hand, when it is determined in S120 that automatic driving is possible and communication is required to continue automatic driving, the automatic drive control unit 47 generates a communication utilization request in S130. In subsequent S140, the automatic drive control unit 47 transmits a communication utilization request to the communication ECU 100, thereby inquiring whether or not communication is required.

Then, in S150, the automatic drive control unit 47 sets the cloud utilization condition based on the response of the communication ECU 100 to the inquiry in S140. Thereby, the automatic drive control unit 47 limits communication utilization within the setting range.

Next, a data transmission processing method performed by the automatic drive ECU 40 will be described with reference to FIG. 7. First, in S210, the surrounding environment recognition unit 43 acquires various sensor data which are utilizable for continuation of the automatic driving in the self-vehicle or other vehicles. Next, in S220, the automatic drive control unit 47 generates a communication utilization request, for reporting the sensor data to the center server 3.

Next, in S230, the automatic drive control unit 47 inquires the communication ECU 100 regarding whether communication utilization is possible or not. Generating a communication utilization request corresponds to performing a procedure to request for communication, for securing required radio communication resources to transmit sensor data that are acquired by the self-vehicle. Further, in S240, the automatic drive control unit 47 transmits various sensor data, by using radio communication resources instructed as a response from the communication ECU 100 to the above-described inquiry. Although the above described example uses radio resources instructing upon generating and receiving the communication utilization request to the communication ECU 100, the radio resources instructed to an in-vehicle device during a wait/standby time may be used.

Next, a communication control method performed by the communication ECU 100 will be described, according to FIG. 8.

First, in S310, the requested bandwidth calculation unit 130 acquires an inquiry of whether the communication utilization is possible from the automatic drive ECU 40. Next, in S320, the requested bandwidth calculation unit 130 calculates two levels of requested bandwidth, that is, the desired bandwidth and the required bandwidth, based on the acquired inquiry content. Subsequently, in S330, the bandwidth request unit 140 transmits a communication bandwidth reservation request based on the requested bandwidth to the center server 3 via the wide-area transmission/reception unit 120.

Then, in S340, the bandwidth request unit 140 acquires the response result from the center server 3 with respect to the communication bandwidth reservation request, and determines the content of the response result. Specifically, in S340, it is determined whether the response result is a response to the communication bandwidth reservation request or a response notifying a change of a reservation request.

When it is determined that the response result is acquired as a response to the communication bandwidth reservation request, in S350, the cooperation condition notification unit 150 transmits, to the automatic drive ECU 40, a notification that utilization of communication is possible (i.e., utilization availability notification) and a notification of available requested bandwidth among the two levels (i.e., possible content notification).

On the other hand, if it is determined in S340 that the response result is acquired as a notification of the change of the reserved bandwidth, in S360, a notification regarding the content of the change (i.e., change content notification) is transmitted to the automatic drive ECU 40.

Figure 9:
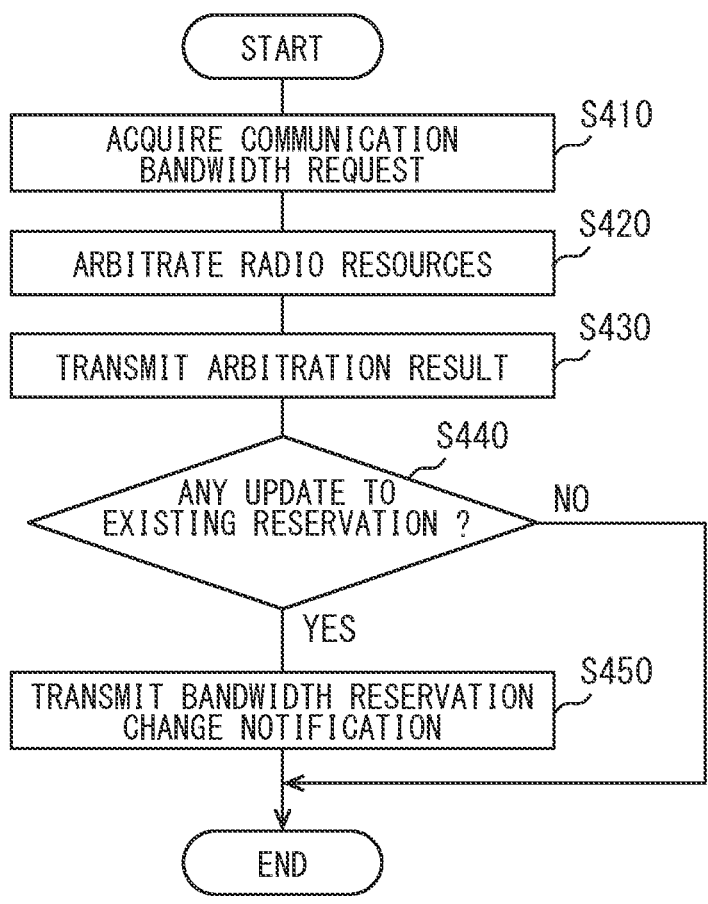
FIG. 9 is a flowchart showing an example of a communication management method performed by the center server.

Next, a communication management method performed by the center server 3 will be described with reference to FIG. 9. First, in S410, the request acquisition unit 310 acquires a communication bandwidth request. Next, in S420, the radio resource arbitration unit 320 identifies allocatable frequencies corresponding to the vehicle A based on the communication capacity of the vehicle A, predicts whether or not the requested bandwidth can be secured within the allocatable frequencies, and arbitrates the communication resource. Then, in S430, the request response unit 350 transmits an arbitration result to the communication ECU 100 of the vehicle A as a response result with respect to the communication bandwidth request.

Subsequently, in S440, the radio resource arbitration unit 320 determines whether or not an existing reservation has been updated by the resource arbitration of S420. If it is determined that the existing reservation has been updated, then in S450, a bandwidth reservation change notification is transmitted to a vehicle corresponding to the updated existing reservation, and the series of processing ends. On the other hand, if it is determined in S440 that the existing reservation has not been updated, the process of S450 is skipped and the series of processing ends.

Note that S410 described above is an example of an "acquisition process," S420 is an example of an "identifying process," and S430 is an example of a "transmission process."

According to the first embodiment described above, the frequency band to which the requested bandwidth is allocated for execution of the specific process in the vehicle A is identified according to the communication capacity, which is different vehicle to vehicle. Therefore, respectively different frequency bands are allocatable to the vehicles according to the communication capacity of respective vehicles. Thus, congestion of communication is suppressible.

Further, according to the first embodiment, the frequency band to be allocated is identified based on differences in the frequency bands available for communication among the plurality of vehicles. Therefore, overlapping of frequency bands allocated respectively to the plurality of vehicles A is relatively easily resolvable. Thus, congestion of communication is more easily suppressible.

Second Embodiment

In the second embodiment, a modification of the center server 3 in the first embodiment is described. In the second embodiment, the radio resource arbitration unit 320 identifies the allocated frequency based on a communication standard that the vehicle A supports.

For example, a request is acquired from the vehicle A corresponding to 5G wireless communication, the radio resource arbitration unit 320 identifies a frequency band corresponding to 5G as the allocated frequency, and determines whether the requested bandwidth is reservable as radio resources in the allocated frequency band. The radio resource arbitration unit 320 may determine that the allocated frequency is a suitable frequency band for accommodating a 5G terminal.

According to the above, the allocated frequency band is identified based on the differences in communication standard among the plurality of vehicles. Therefore, when receiving communication utilization requests respectively from the plurality of vehicles A, overlapping of the allocated frequency bands is relatively easily resolvable. Thus, congestion of communication is more easily suppressible.

Other Embodiments

The disclosure in the present description is not limited to the above-described embodiments. The present disclosure includes embodiments described above and modifications of the above-described embodiments made by a person skilled in the art. For example, the present disclosure is not limited to a combination of the components and/or elements described in the embodiments. The present disclosure may be realized by various different combinations. The present disclosure may include additional configuration that can be added to the above-described embodiments. The present disclosure also includes modifications of the embodiments from which a component and/or an element is omitted. The present disclosure includes replacements of components and/or elements between one embodiment and another embodiment, or combinations of components and/or elements between one embodiment and another embodiment. The disclosed technical scope is not limited to the description of the embodiments. It should be understood that some disclosed technical ranges are indicated by description of claims, and includes every modification within the equivalent meaning and the scope of description of claims.

In the above-described embodiment, the request acquisition unit 310 acquires, as the requested bandwidth, a communication bandwidth requested for the execution of automatic drive control. However, the request bandwidth may also be acquired for execution of processing other than the automatic drive control. For example, the request acquisition unit 310 may acquire a requested bandwidth for executing display processing of video content on an in-vehicle display.

The center server 3 may be a dedicated computer including at least one of a digital circuit and an analog circuit as a processor. In particular, the digital circuit is at least one type of, for example, an ASIC (Application Specific Integrated Circuit), an FPGA (Field Programmable Gate Array), an SOC (System on a Chip), a PGA (Programmable Gate Array), a CPLD (Complex Programmable Logic Device), and the like. Such a digital circuit may include a memory in which a program is stored.

The center server 3 may be provided by a single computer or by a set of computer resources linked by a data communications device. For example, some of the functions provided by the center server 3 in the above-described embodiments may be realized by another ECU. Further, an ECU realizing a function of the center server 3 may be disposed in the vehicle A.

What is claimed is:

1. A communication management device for managing communication between a vehicle and an outside of the vehicle, the communication management device comprising:

an acquisition unit configured to acquire a requested bandwidth, which is a communication bandwidth requested for execution of a specific process in the vehicle, and includes a desired bandwidth and a required bandwidth that are different level bandwidths;

an identification unit configured to identify a frequency band to which the requested bandwidth is allocated, according to a communication capacity of the vehicle; and a transmission unit configured to transmit to the vehicle, an allocation result of allocating the requested bandwidth with respect to the identified frequency band, wherein the allocation result includes whether at least one of the desired bandwidth or/and the required bandwidth is available;

wherein:

the vehicle is one of a plurality of vehicles, which includes a first vehicle having a first supported frequency band, and a second vehicle having a second supported frequency band that is narrower than the first supported frequency band; and the identification unit identifies a frequency band that is outside the second supported frequency band and within the first supported frequency band, as the frequency band to be allocated to the first vehicle.

2. The communication management device according to claim 1, wherein the identification unit identifies the frequency band to be allocated based on differences in the frequency bands available for communication among the plurality of vehicles.

3. The communication management device according to claim 1, wherein the identification unit identifies the frequency band to be allocated based on a communication standard that the vehicle supports.

4. The communication management device according to claim 1, wherein:

the plurality of vehicles includes a third vehicle and a fourth vehicle;

the identification unit is further configured to:

determine whether the desired bandwidth or the required bandwidth of the third vehicle is secured as the requested bandwidth;

determine whether a reserve request of the requested bandwidth of the third vehicle falls outside a capacity of a radio resource of a base station, as the outside; and determine whether the requested bandwidth of the third vehicle is secured by changing a part of the radio resource that has been reserved as a desired bandwidth of the fourth vehicle to a required bandwidth of the fourth vehicle upon determining that the reserve request of the requested bandwidth falls outside the capacity of the radio resource of the base station.

5. The communication management device according to claim 4, wherein the identification unit is configured to change the part of the radio resource that has been reserved as the desired bandwidth of the fourth vehicle to the required bandwidth of the fourth vehicle upon determining that the requested bandwidth of the third vehicle is secured by changing the part of the radio resource.

6. A communication management method performed by a processor for managing communication between a vehicle and an outside of the vehicle, the communication management method comprising:

acquiring a requested bandwidth, which is a communication bandwidth requested for execution of a specific process in the vehicle, and includes a desired bandwidth and a required bandwidth that are different level bandwidths;

identifying a frequency band to which the requested bandwidth is allocated, in accordance with a communication capacity of the vehicle; and transmitting, to the vehicle, an allocation result of allocating the requested bandwidth with respect to the identified frequency band, wherein the allocation result includes whether at least one of the desired bandwidth or/and the required bandwidth is available;

wherein:

the vehicle is one of a plurality of vehicles, which includes a first vehicle having a first supported frequency band, and a second vehicle having a second supported frequency band that is narrower than the first supported frequency band; and the method further comprises identifying a frequency band that is outside the second supported frequency band and within the first supported frequency band, as the frequency band to be allocated to the first vehicle.

7. A non-transitory, tangible storage medium storing a communication control program including instructions configured to, when executed by a processor, cause the processor to:

acquire a requested bandwidth, which is a communication bandwidth requested for execution of a specific process, and includes a desired bandwidth and a required bandwidth that are different level bandwidths;

identify a frequency band to which the requested bandwidth is allocated, according to a communication capacity of a device with the specific process; and transmit to a vehicle, an allocation result of allocating the requested bandwidth with respect to the identified frequency band, wherein the allocation result includes whether at least one of the desired bandwidth or/and the required bandwidth is available;

wherein:

the vehicle is one of a plurality of vehicles, which includes a first vehicle having a first supported frequency band, and a second vehicle having a second supported frequency band that is narrower than the first supported frequency band; and the instructions are further configured to, when executed by the processor, cause the processor to identify a frequency band that is outside the second supported frequency band and within the first supported frequency band, as the frequency band to be allocated to the first vehicle.

8. The medium according to claim 7, wherein the specific process is for a communication management of a vehicle.

9. The medium according to claim 7, wherein the specific process is for an automatic drive control for a vehicle.

10. The medium according to claim 7, wherein the requested bandwidth is the communication bandwidth requested for execution of an automatic drive control based on a surrounding environment of a vehicle and an automatic drive of the vehicle requested by a user.

* * * * *